US011558332B1

(12) United States Patent
Ho et al.

(10) Patent No.: US 11,558,332 B1
(45) Date of Patent: *Jan. 17, 2023

(54) AUTOMATED ELECTRONIC PACKAGE TRANSMISSION METHOD SELECTION

(71) Applicant: Biscom Inc., Westford, MA (US)

(72) Inventors: Shu-Kuang Ho, Carlisle, MA (US); Zhonghui Xiao, Westford, MA (US)

(73) Assignee: Biscom Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,724

(22) Filed: Jan. 24, 2022

(51) Int. Cl.
*H04L 51/214* (2022.01)
*H04L 51/42* (2022.01)
*H04L 51/48* (2022.01)

(52) U.S. Cl.
CPC .......... *H04L 51/214* (2022.05); *H04L 51/42* (2022.05); *H04L 51/48* (2022.05)

(58) Field of Classification Search
CPC ........ H04L 51/214; H04L 51/42; H04L 51/48
See application file for complete search history.

(56) References Cited

U.S. PATENT DOCUMENTS

| | | | |
|---|---|---|---|
| 2003/0225850 A1* | 12/2003 | Teague | G06Q 10/107 709/207 |
| 2013/0346522 A1* | 12/2013 | Lennstrom | H04L 51/08 709/206 |

* cited by examiner

*Primary Examiner* — Austin J Moreau
(74) *Attorney, Agent, or Firm* — Blueshift IP, LLC; Robert Plotkin (57) ABSTRACT

A first email message is received. The first email message has a first recipient email address and a first payload. The first recipient email address has a first username portion and a first domain name portion. If a user account is associated with the first username portion, then the first payload is transmitted to an email address associated with that user account. Otherwise, the first payload is transmitted, via a fax transmission method, to a first destination specified by a first destination identifier based on the first username portion of the first recipient email address.

40 Claims, 4 Drawing Sheets

AUTOMATED ELECTRONIC PACKAGE TRANSMISSION METHOD SELECTION

BACKGROUND

A wide variety of options are available today for message and document delivery. These include email (non-secure or secure), SMS/text (non-secure or secure), file transfer (non-secure or secure), fax and voice. In current approaches, the transmission method employed for message and document delivery is established by the sender. For example, a sender who wishes to transmit a document via fax typically sends the document using a conventional fax machine or fax software. As a result, the document is transmitted to the recipient via fax.

One drawback of this approach is that the most efficient and/or effective transmission method for transmitting content to the recipient may not be known to the sender. For example, the recipient may be capable of receiving content via high-resolution digital fax, but the sender might not know this. However, because existing systems require the sender to specify the transmission method, in such systems the sender's lack of knowledge of the most effective and/or efficient transmission method may result in a suboptimal transmission method being used instead.

Some existing systems enable senders to transmit faxes by sending an email to a fax server. For example, to transmit a fax message via conventional fax to a particular fax number, the sender may transmit an email message having the format <fax number>@faxserver.com, where <fax number> is the conventional fax number of the recipient, and faxserver.com is the domain of a fax server. The fax server may receive this email message and transmit the contents of that email message to the recipient using conventional fax.

It may be beneficial, however, to transmit such messages to the recipient using transmission methods other than conventional fax. Existing systems lack this ability.

SUMMARY

One aspect of the present invention is directed to a computer-implemented method in which a sender sends an email message of the form <fax number>@<domain>. A server located at the domain specified by <domain> receives the email message and determines whether a user account is associated with the fax number specified by <fax number>. If there is such a user account, the server transmits contents of the email message to a user associated with the user account. If there is no such user account, the server transmits the contents of the email message to the fax number specified by <fax number> using a fax transmission method.

Another aspect of the present invention is directed to a computer-implemented method in which a sender sends an email message. A server receives the email message and determines whether the email message's recipient email address is in the format <username><delimiter><domain 1>@<domain 2>, where <delimiter> is text other than the at-symbol (i.e., "@"). For example, <delimiter> may be "$". If the email message's recipient email address is in that format, then the server replaces <delimiter> with "@" and identifies the resulting <username>@<domain 1> as a first destination identifier (e.g., email address). The server then transmits contents of the email message to a destination specified by the first destination identifier. If the email message's recipient email address is not in the above-specified format, then the server identifies a first destination fax number based on the email message's recipient email address (such as by extracting the first destination fax number from the email message's recipient email address), and transmits contents of the email message to the first destination fax number via a conventional fax transmission method.

Other features and advantages of various aspects and embodiments of the present invention will become apparent from the following description and from the claims.

DETAILED DESCRIPTION

One aspect of the present invention is directed to a computer-implemented method in which a sender sends an email message in which the recipient email address is of the form <fax number>@<domain>. A server located at the domain specified by <domain> receives the email message and determines whether a user account is associated with the fax number specified by <fax number>. If there is such a user account, the server transmits contents of the email message to a user associated with the user account. If there is no such user account, the server transmits the contents of the email message to the fax number specified by <fax number> using a fax transmission method.

Figure 1:
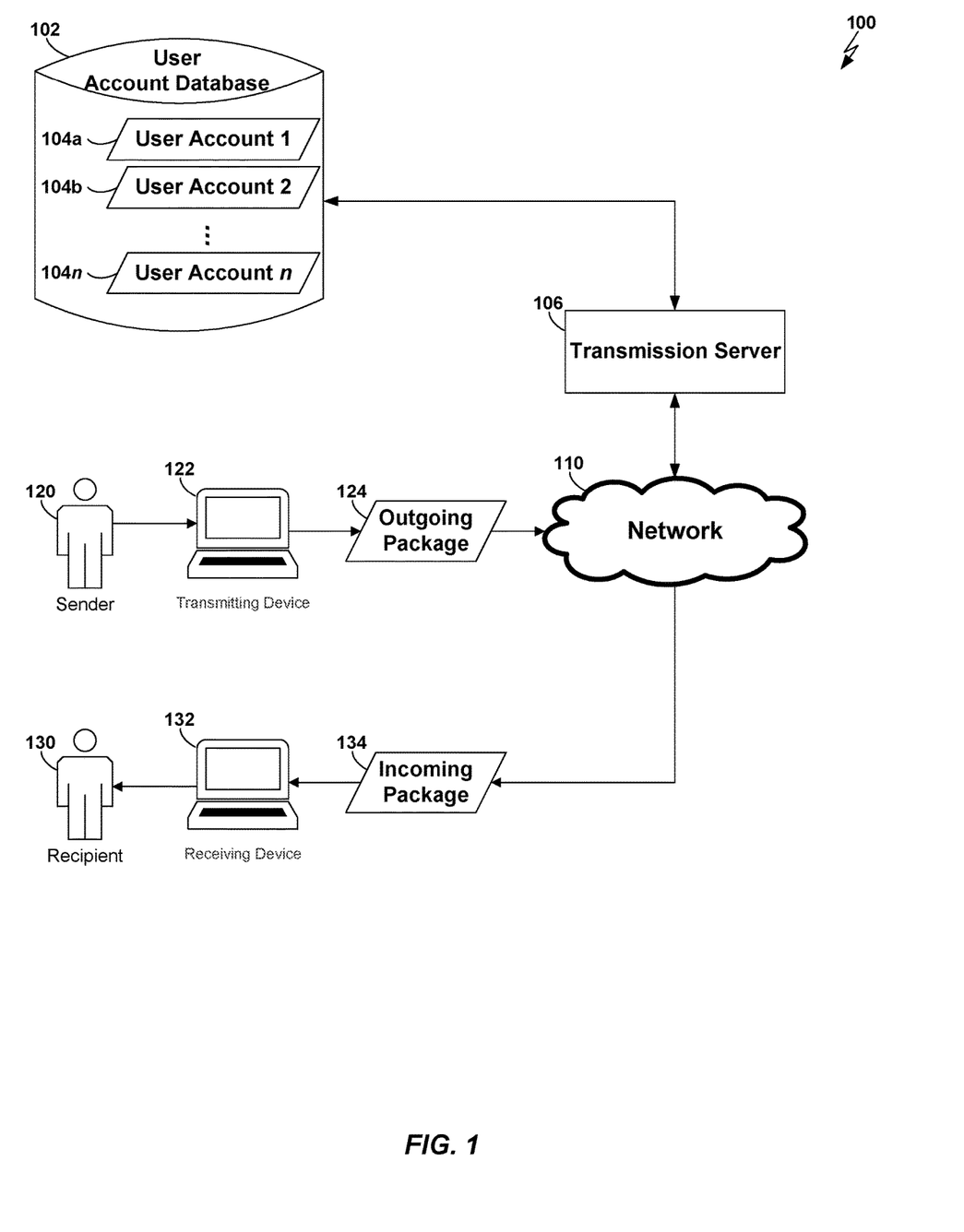
FIG. 1 is a dataflow diagram of a system for transmitting electronic packages according to one embodiment of the present invention.
Figure 2:
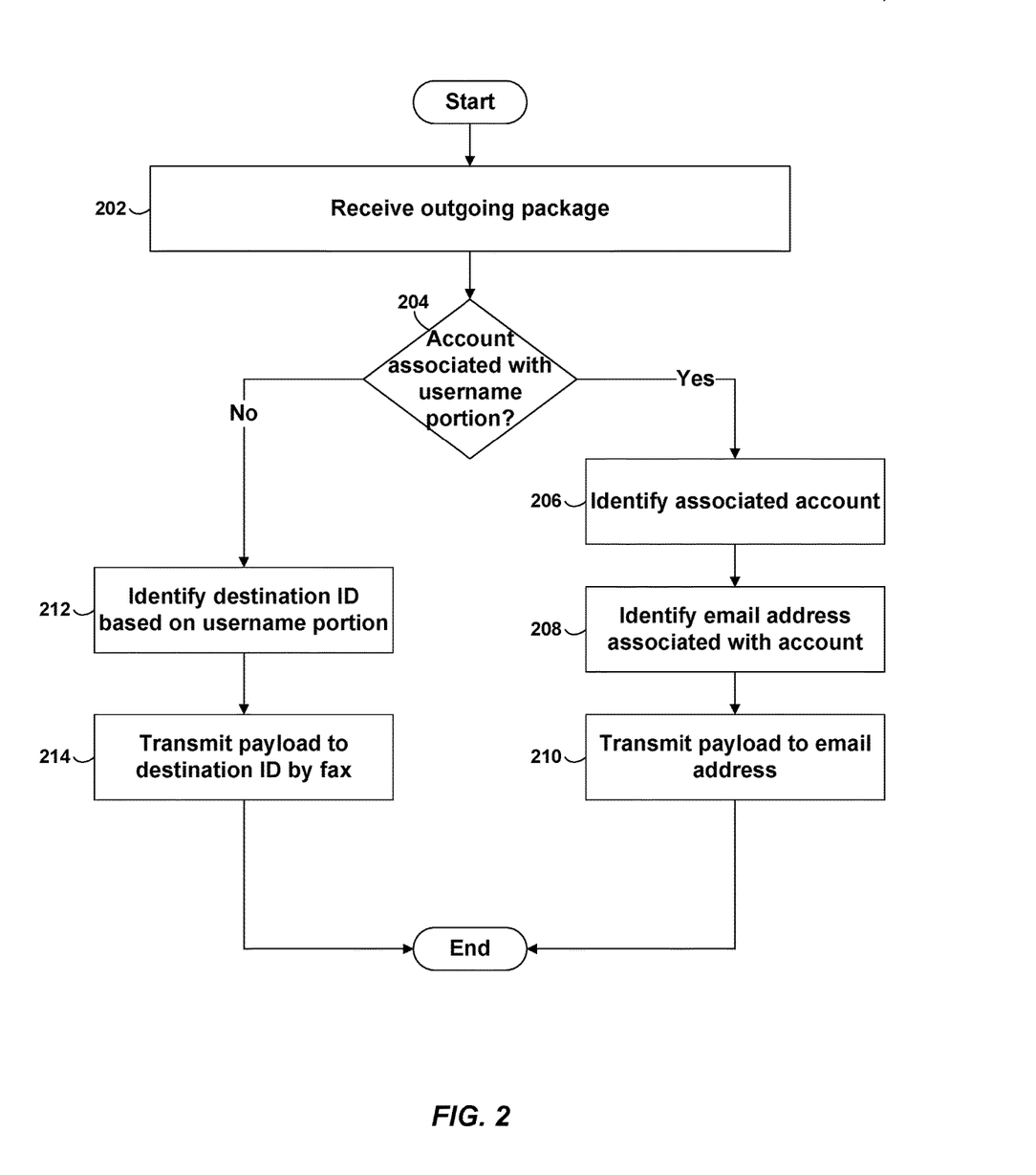
FIG. 2 is a flowchart of a method performed by the system of FIG. 1 according to one embodiment of the present invention.

For example, referring to FIG. 1, a dataflow diagram is shown of a system 100 for transmitting electronic packages according to one embodiment of the present invention. Referring to FIG. 2, a flowchart is shown of a method 200 performed by the system 100 of FIG. 1 according to one embodiment of the present invention.

The system 100 includes a user account database 102, which includes a plurality of user accounts 104*a-n*, where n may be any number. Each of the user accounts 104*a-n* corresponds to, and obtains account information for, a distinct corresponding user. Each of the user accounts 104*a-n* (also referred to herein as an "account record") may include any of a variety of information about the corresponding user, such as any one or more of the following, in any combination: (1) username (which may, for example, be an email address); (2) password and/or other login credentials; (3) email address (if not already contained in the username); (4) real name; and (5) fax number. These are merely examples of data that may be contained in the user accounts 104*a-n*. In practice, the user accounts 104*a-n* may contain data in addition to that just described, and need not contain all of the data just described.

The system 100 also includes a transmission server 106. The transmission server 106 may be capable of transmitting and receiving, over a network 110, electronic messages, such as any one or more of the following: (1) conventional faxes; (2) digital faxes; (3) email messages; and (4) secure file transfers. The term "electronic package" is used herein to refer generically to a transmission of any type of data. For example, conventional faxes, digital faxes, email messages, and secure file transfers are all examples of "electronic packages," as that term is used herein.

The network 110 may be any kind of electronic network, such as any one or more of the following, in any combination: a POTS (Plain Old Telephone Service Network), a local area network, or a wide area network (such as the Internet). As this implies, the network 110 may be an analog network, a digital network, or both.

The system 100 also includes a sender 120 (also referred to as a transmitter) and a transmitting device 122 (also referred to as a sending device). The transmitting device 122 may be any of a variety of devices, such as a conventional fax machine or any type of computing device, such as a laptop computer, desktop computer, tablet computer, or smartphone. The sender 120 may use different transmitting devices at different times. The transmitting device 122 in FIG. 1 represents any such device. As a result, the transmitting device 122 may vary over time. The sender 120 may provide any of the kinds of inputs disclosed to the transmitting device 122 herein via any of a variety of input devices (e.g., keyboards, touch screens, and microphones).

The system 100 also includes a recipient 130 (also referred to as a receiver) and a receiving device 132 (also referred to as a recipient device). The receiving device 132 may be any of a variety of devices, such as a conventional fax machine or any type of computing device, such as a laptop computer, desktop computer, tablet computer, or smartphone. The recipient 130 may use different receiving devices at different times. The receiving device 132 in FIG. 1 represents any such device. As a result, the receiving device 132 may vary over time. The recipient 130 may receive any of the kinds of outputs disclosed herein from the receiving device 132 via any of a variety of output devices (e.g., monitors, touch screens, and speakers).

The sender 120 provides suitable input to the transmitting device 122 to cause the transmitting device 122 to generate and transmit an outgoing electronic package 124 (e.g., email message) over the network 110 to the transmission server 106. The outgoing electronic package 124 has a first recipient email address and a first payload (such as a message body and/or one or more attachments). The first recipient email address has a first username portion and a first domain name portion. For example, the first recipient email address may have the following format: <username>@<domain 1>, where <domain 1> specifies a domain at which the transmission server 106 is addressable. This is what causes the outgoing package 124 to be delivered to, and received by, the transmission server 106.

The transmission server 106 receives the outgoing package 124 over the network 110 (FIG. 2, operation 202). The transmission server 106 determines whether the user accounts 104a-n include any user accounts associated with the first username portion of the first recipient email address (FIG. 2, operation 204). For example, the transmission server 106 may determine whether the username of any of the user accounts 104a-n is the same as the first username portion (or a subset of the first username portion) of the first recipient email address.

Consider, as a particular example, that the first recipient email address is 999-555-1234@domain1.com. In this example, "999-555-1234" is the first username portion of the first recipient email address. In operation 204, the transmission server 106 may determine whether any of the user accounts 104a-n contains "999-555-1234", e.g., in its username field, fax number field, or other field. In some embodiments, the transmission server 106 only determines whether a specific field of the user accounts 104a-n (e.g., the username field or the fax number field) contains the first username portion of the first recipient email address. In other embodiments, the transmission server 106 determines whether any of a plurality of fields of the user accounts 104a-n contains the first username portion of the first recipient email address.

If the transmission server 106 determines that the user accounts 104a-n includes a user account associated with the first username portion of the first recipient email address, then the transmission server: (1) identifies a first user account, within the plurality of user accounts 104a-n, associated with the first username portion (FIG. 2, operation 206); (2) identifies an email address associated with the first user account as a first destination email address (FIG. 2, operation 208); and (3) transmits the first payload to the first destination email address (FIG. 2, operation 210).

Assume, solely for the sake of example, that user account 104b is associated with the first username portion of the outgoing package 124 (e.g., because the username field of the account 104b contains text that is the same as the first username portion, or a subset thereof). In this case, the transmission server 106 would identify account 104b as the first user account in operation 206, and would identify an email address associated with account 104b as the first destination email address in operation 208, such as by identifying the contents of the "email address" field of account 104b as the first destination email address.

If it is not determined that the plurality of user accounts 104a-n includes any user accounts associated with the first username portion, then the transmission server 106: (1) identifies a first destination identifier based on the first username portion of the first recipient email address (FIG. 2, operation 212); and (2) transmits, via a fax transmission method, the first payload to a first destination specified by the first destination identifier (FIG. 2, operation 214). The incoming package 134 shown in FIG. 2 may, for example, be a fax transmission transmitted by the transmission server 106 to receiving device 132 in operation 214. The receiving device 132 may generate output, to the recipient 130, representing the incoming package 134. The fax transmission method may for example, be a conventional fax transmission method performed over a POTS network, or a digital fax transmission method performed over a digital network.

As the above example illustrates, the first username portion may be or include a first fax number (e.g., 999-555-1234), in which case the first destination identifier may be or include the first fax number. Operation 210 may include transmitting the first payload to the first fax number via a digital fax transmission method. In embodiments in which the first username portion is or includes a first fax number, operation 204 may include determining whether the plurality of user accounts 104a-n includes any user accounts associated with the first fax number. In such embodiments, the first user account (identified in operation 206) may include both the first username portion (e.g. fax number in a fax number field of the identified user account) and the first destination email address (e.g., in a username field or email address field of the first user account), and operation 208 may include identifying the first destination email address within the first user account (e.g., within the username or email address field of the first user account).

The first user account (e.g., account 104b) may include multiple email addresses, in which case operation 208 may include identifying such multiple email addresses, and operation 210 may include transmitting the first payload to each of such multiple email addresses.

As described above, one fax number may be associated with one or more email addresses in the user accounts 104a-n. Similar, multiple fax numbers in the user accounts 104a-n may correspond to the same email address. As a particular example:

account 104a may include (e.g., in its username field or fax number field) a first fax number;

account 104a may include (e.g., in its username field or email address field) a first email address;

account 104b may include (e.g., in its username field or fax number field) a second fax number that differs from the first fax number; and account 104b may include (e.g., in its username field or email address field) the first email address, i.e., the same email address as account 104a.

Another aspect of the present invention is directed to a computer-implemented method in which a sender sends an email message. A server receives the email message and determines whether the recipient email address is of the email message is of the form <username><delimiter><domain 1>@<domain 2> (e.g., jsmith$company.com@transmission.com). If it is, then the server extracts the recipient email address (e.g., jsmith@company.com), and sends the email message (or its body, attachment(s), and/or other payload) digitally to the extracted recipient email address. If the server instead determines that the recipient email address is of the form <faxnumber>@<domain 2>, then the server sends the email message (or its body, attachment(s), and/or other payload) by a conventional fax transmission method to the fax number specified by <faxnumber>.

Figure 3:
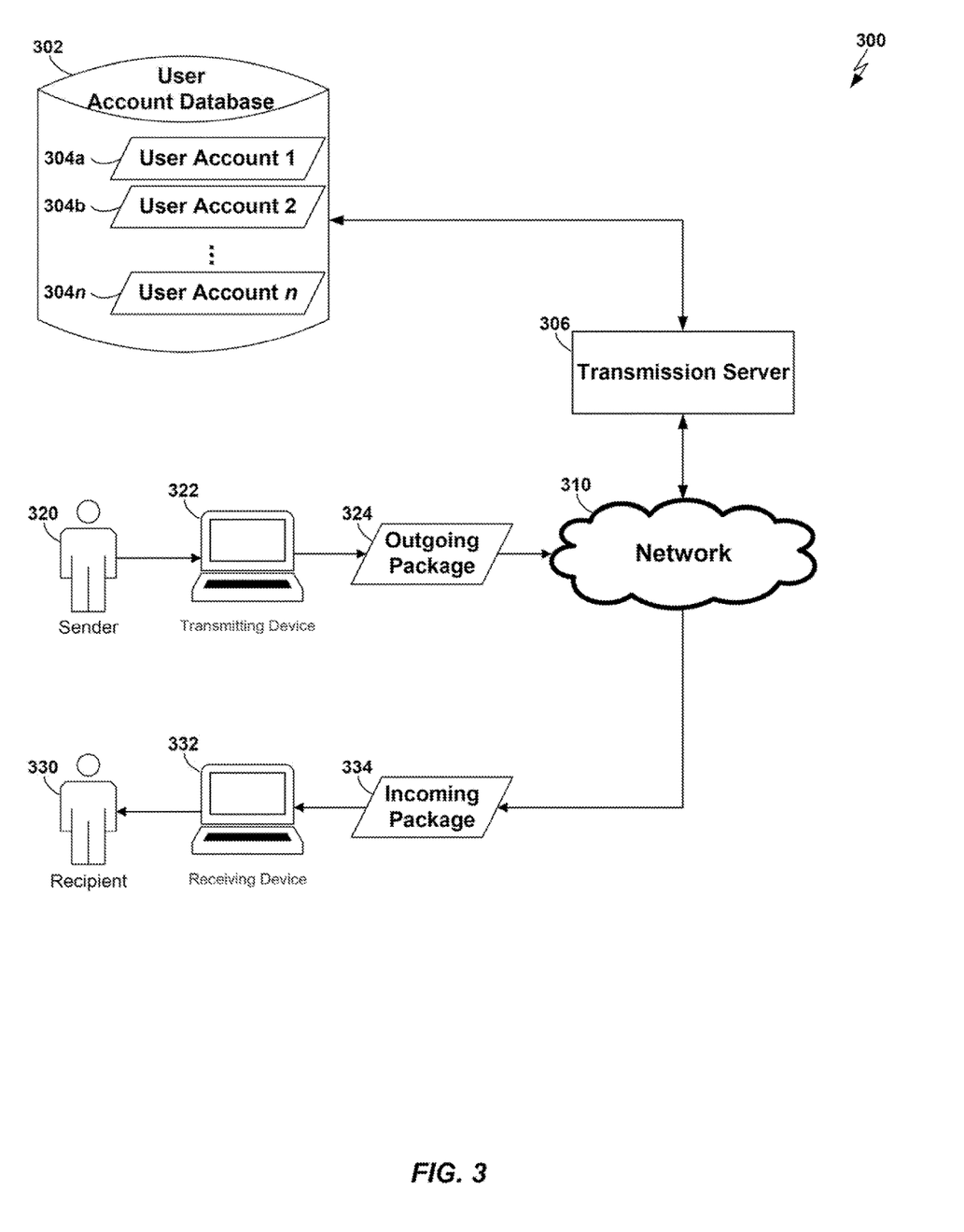
FIG. 3 is a dataflow diagram of a system for transmitting electronic packages according to another embodiment of the present invention.
Figure 4:
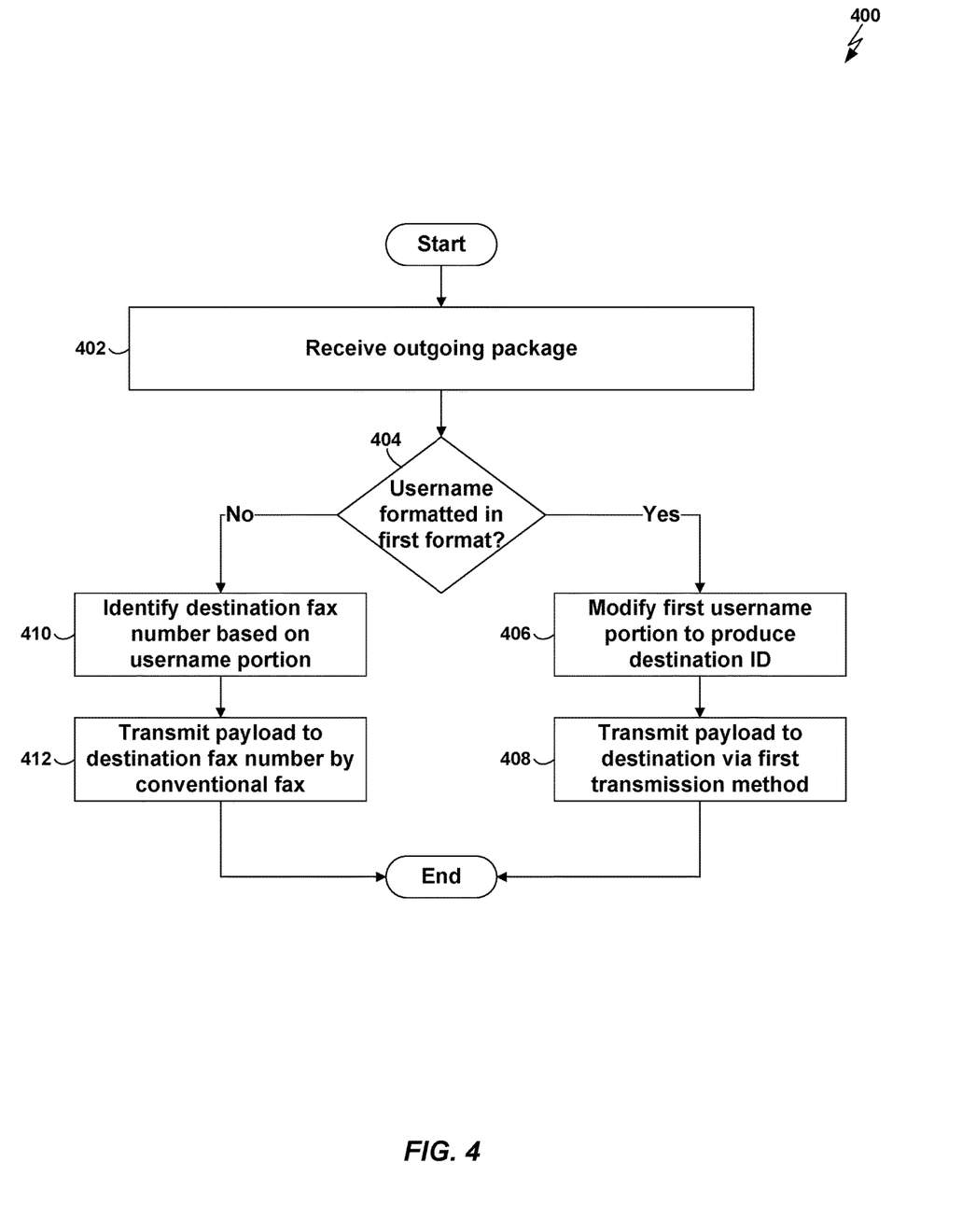
FIG. 4 is a flowchart of a method performed by the system of FIG. 3 according to one embodiment of the present invention.

For example, referring to FIG. 3, a dataflow diagram is shown of a system 300 for transmitting electronic packages according to one embodiment of the present invention. Referring to FIG. 4, a flowchart is shown of a method 400 performed by the system 300 of FIG. 3 according to one embodiment of the present invention.

The system 300 of FIG. 3 includes elements that are similar to those of the system 100 of FIG. 1. Unless stated otherwise, the following elements may be assumed to operate in the same manner as each other:

the user account databases 102 and 302;
the user accounts 104a-n and 304a-n;
the transmission servers 106 and 306;
the networks 110 and 310;
the senders 120 and 320;
the transmitting devices 122 and 322;
the outgoing packages 124 and 324;
the incoming packages 134 and 334;
the receiving devices 132 and 332; and
the recipients 130 and 330.

As a result, the aspects of the elements of FIG. 3 that are the same as the corresponding elements of FIG. 1 will not be described herein. Instead, only the aspects of the elements of FIG. 3 that differ from the corresponding elements of FIG. 1 will be described herein.

The transmission server 306 receives the outgoing package 324 over the network 310 (FIG. 4, operation 402). The outgoing package 324 may, for example, be a first email message having a first recipient email address and a first payload (e.g., a body and/or one or more attachments). The first recipient email address may have a first username portion and a first domain name portion. For example, the first recipient email address may be of the form <username 1>@<domain 1>.

The transmission server 306 determines whether the first username portion: (1) is formatted according to a first format; or (2) is formatted according to a second format (FIG. 4, operation 404).

The first format may, for example, include a second username portion, followed by delimiter text, followed by a second domain name portion. A particular example of this first format is <username 2>$<domain 2>, in which <username 2> is an example of the second username portion, "$" is an example of the delimiter text, and <domain 2> is an example of the second domain name portion. A concrete example of a recipient email address in this format is jsmith$company.com@transmission.com, in which jsmith$company.com is an example of the second username portion. As this example illustrates, the delimiter text may be, or include, text other than an at-symbol (i.e., "@").

In response to determining that the first username portion is formatted according to the first format, the transmission server 306 may: (1) modify the first username portion to produce a first destination identifier (FIG. 4, operation 406); and (2) transmit the first payload by a first transmission method to a destination specified by the first destination identifier (FIG. 4, operation 408). The incoming package 334 is an example of the first payload being transmitted by the transmission server 306 to the recipient 330 (via the receiving device 332) in operation 408.

Modifying the first username in operation 406 may include replacing the delimiter text in the first username portion with an at-symbol (i.e., "@") to produce the first destination identifier. As a concrete example, modifying the first username in operation 406 may include replacing "$" with "@" in jsmith$company.com to produce jsmith@company.com. As this example illustrates, the resulting first destination identifier may be, or include, a destination email address.

The first transmission method may be, or include, a digital fax transmission method. The first transmission may be, or include, a secure file transfer transmission method.

In response to determining that the username portion is formatted according to the second format, the transmission server 306 may: (1) identify a first destination fax number based on the first username portion (FIG. 4, operation 410); and (2) transmit the first payload to the first destination fax number via a conventional fax transmission method (FIG. 4, operation 412). The incoming package 334 is an example of the first payload being transmitted by the transmission server 306 to the recipient 330 (via the receiving device 332, which may be a conventional fax machine) in operation 412.

The first username portion may include the first destination fax number. For example, the first username portion may be of the form <faxnumber>. The first username portion may include additional elements. For example, the first username portion may be of the form <first name>.<last name>.<faxnumber>. In such cases, the first username portion still includes the first destination fax number. The transmission server 306 may, in operation 410, identify the first destination fax number by extracting the first destination fax number from the first username portion. As a concrete example, if the first recipient email address is "John.Smith.999-555-1234@transmission.com", then the transmission server 306 may, in operation 410, identify the first destination fax number by extracting "999-555-1234" from "John.Smith.999-555-1234@transmission.com".

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention transmit messages via email, digital fax, and conventional fax transmission methods. As additional examples, embodiments of the present invention automatically select a transmission method and then transmit an electronic package over a communication network using the automatically selected transmission method. Such functions are inherently rooted in computer technology and cannot be performed mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A method performed by at least one computer processor executing computer program instructions stored on at least one non-transitory computer-readable medium, the method comprising:
   (A) receiving a first email message having a first recipient email address and a first payload, the first recipient email address having a first username portion and a first domain name portion;
   (B) determining whether a plurality of user accounts includes any user accounts associated with the first username portion;
   (C) if it is determined that the plurality of user accounts includes any user accounts associated with the first username portion, then:
      (C) (1) identifying a first user account, within the plurality of user accounts, associated with the first username portion;
      (C) (2) identifying an email address associated with the first user account as a first destination email address; and
      (C) (3) transmitting the first payload to the first destination email address;
   (D) if it is not determined that the plurality of user accounts includes any user accounts associated with the first username portion, then:
      (D) (1) identifying a first destination identifier based on the first username portion of the first recipient email address; and
      (D) (2) transmitting, via a fax transmission method, the first payload to a first destination specified by the first destination identifier.

2. The method of claim 1, wherein the first payload comprises a first body of the first email message.

3. The method of claim 1, wherein the first payload comprises a first attachment to the first email message.

4. The method of claim 1, wherein the first username portion comprises a first fax number, and wherein (C) (2) comprises transmitting the first payload to the first fax number via a digital fax transmission method.

5. The method of claim 1, wherein the first username portion comprises a first fax number, and wherein (B) comprises determining whether the plurality of user accounts includes any user accounts associated with the first fax number.

6. The method of claim 1, wherein the first user account includes the first username portion and the first destination email address, and wherein (C) (1) comprises identifying the first destination email address within the first user account.

7. The method of claim 6, wherein the first user account includes the first username portion, the first destination email address, and a second destination email address.

8. The method of claim 7, wherein (C) (2) further comprises transmitting the first payload to the second destination email address.

9. The method of claim 1, wherein the first username portion of the first recipient email address comprises a first fax number, and wherein (D) (1) comprises identifying the first destination identifier as the first fax number.

10. The method of claim 9, wherein (D) (2) comprises transmitting the first payload to the first fax number via a conventional fax transmission method.

11. The method of claim 9, wherein (D) (2) comprises transmitting the first payload to the first fax number via a digital fax transmission method.

12. The method of claim 1, further comprising:
   (E) receiving a second email message having a second recipient email address and a second payload, the second recipient email address having a second username portion and a second domain name portion;
   (F) determining whether the plurality of user accounts includes any user accounts associated with the second username portion; and
   (G) if it is determined that the plurality of user accounts includes any user accounts associated with the second username portion, then:
      (G) (1) identifying the first user account, within the plurality of user accounts, associated with the second username portion;
      (G) (2) identifying the email address associated with the first user account as a second destination email address; and
      (G) (3) transmitting the second payload to the second destination email address.

13. A system comprising at least one non-transitory computer-readable medium having computer program instructions stored thereon, the computer program instructions being executable by at least one computer processor to perform a method, the method comprising:
   (A) receiving a first email message having a first recipient email address and a first payload, the first recipient email address having a first username portion and a first domain name portion;
   (B) determining whether a plurality of user accounts includes any user accounts associated with the first username portion;
   (C) if it is determined that the plurality of user accounts includes any user accounts associated with the first username portion, then:
      (C) (1) identifying a first user account, within the plurality of user accounts, associated with the first username portion;
      (C) (2) identifying an email address associated with the first user account as a first destination email address; and
      (C) (3) transmitting the first payload to the first destination email address;
   (D) if it is not determined that the plurality of user accounts includes any user accounts associated with the first username portion, then:
      (D) (1) identifying a first destination identifier based on the first username portion of the first recipient email address; and
      (D) (2) transmitting, via a fax transmission method, the first payload to a first destination specified by the first destination identifier.

14. The system of claim 13, wherein the first payload comprises a first body of the first email message.

15. The system of claim 13, wherein the first payload comprises a first attachment to the first email message.

16. The system of claim 13, wherein the first username portion comprises a first fax number, and wherein (C) (2) comprises transmitting the first payload to the first fax number via a digital fax transmission method.

17. The system of claim 13, wherein the first username portion comprises a first fax number, and wherein (B) comprises determining whether the plurality of user accounts includes any user accounts associated with the first fax number.

18. The system of claim 13, wherein the first user account includes the first username portion and the first destination email address, and wherein (C) (1) comprises identifying the first destination email address within the first user account.

19. The system of claim 18, wherein the first user account includes the first username portion, the first destination email address, and a second destination email address.

20. The system of claim 19, wherein (C) (2) further comprises transmitting the first payload to the second destination email address.

21. The system of claim 13, wherein the first username portion of the first recipient email address comprises a first fax number, and wherein (D) (1) comprises identifying the first destination identifier as the first fax number.

22. The system of claim 21, wherein (D) (2) comprises transmitting the first payload to the first fax number via a conventional fax transmission method.

23. The system of claim 21, wherein (D) (2) comprises transmitting the first payload to the first fax number via a digital fax transmission method.

24. The system of claim 13, further comprising:
(E) receiving a second email message having a second recipient email address and a second payload, the second recipient email address having a second username portion and a second domain name portion;
(F) determining whether the plurality of user accounts includes any user accounts associated with the second username portion; and
(G) if it is determined that the plurality of user accounts includes any user accounts associated with the second username portion, then:
(G) (1) identifying the first user account, within the plurality of user accounts, associated with the second username portion;
(G) (2) identifying the email address associated with the first user account as a second destination email address; and
(G) (3) transmitting the second payload to the second destination email address.

25. A method performed by at least one computer processor executing computer program instructions stored on at least one non-transitory computer-readable medium, the method comprising:
(A) receiving a first email message having a first recipient email address and a first payload, the first recipient email address having a first username portion and a first domain name portion;
(B) determining whether the first username portion:
(1) is formatted according to a first format; or
(2) is formatted according to a second format;
(C) in response to determining that the first username portion is formatted according to the first format:
(C) (1) modifying the first username portion to produce a first destination identifier; and
(C) (2) transmitting the first payload by a first transmission method to a destination specified by the first destination identifier;
(D) in response to determining that the username portion is formatted according to the second format:
(D) (1) identifying a first destination fax number based on the first username portion; and
(D) (2) transmitting the first payload to the first destination fax number via a conventional fax transmission method.

26. The method of claim 25, wherein the first username portion comprises:
a second username portion, followed by delimiter text, followed by a second domain name portion.

27. The method of claim 26, wherein the delimiter text consists of a single character that is not an at symbol.

28. The method of claim 27, wherein (C) (1) comprises replacing the delimiter text in the first username portion with an at symbol to produce the first destination identifier.

29. The method of claim 28, wherein the first destination identifier comprises a destination email address.

30. The method of claim 25, wherein the first transmission method comprises a digital fax transmission method.

31. The method of claim 25, wherein the first transmission method comprises a secure file transfer transmission method.

32. The method of claim 25, wherein the first username portion includes the first destination fax number, and wherein (D) (1) comprises extracting the first destination fax number from the first username portion.

33. A system comprising at least one non-transitory computer-readable medium having computer program instructions stored thereon, the computer program instructions being executable by at least one computer processor to perform a method, the method comprising:
(A) receiving a first email message having a first recipient email address and a first payload, the first recipient email address having a first username portion and a first domain name portion;
(B) determining whether the first username portion:
(1) is formatted according to a first format; or
(2) is formatted according to a second format;
(C) in response to determining that the first username portion is formatted according to the first format:
(C) (1) modifying the first username portion to produce a first destination identifier; and
(C) (2) transmitting the first payload by a first transmission method to a destination specified by the first destination identifier;
(D) in response to determining that the username portion is formatted according to the second format:
(D) (1) identifying a first destination fax number based on the first username portion; and
(D) (2) transmitting the first payload to the first destination fax number via a conventional fax transmission method.

34. The system of claim 33, wherein the first username portion comprises:
a second username portion, followed by delimiter text, followed by a second domain name portion.

35. The system of claim 34, wherein the delimiter text consists of a single character that is not an at symbol.

36. The system of claim 35, wherein (C) (1) comprises replacing the delimiter text in the first username portion with an at symbol to produce the first destination identifier.

37. The system of claim 36, wherein the first destination identifier comprises a destination email address.

38. The system of claim 33, wherein the first transmission method comprises a digital fax transmission method.

39. The system of claim 33, wherein the first transmission method comprises a secure file transfer transmission method.

40. The system of claim 33, wherein the first username portion includes the first destination fax number, and wherein (D) (1) comprises extracting the first destination fax number from the first username portion.

* * * * *